United States Patent Office 2,744,322
Patented May 8, 1956

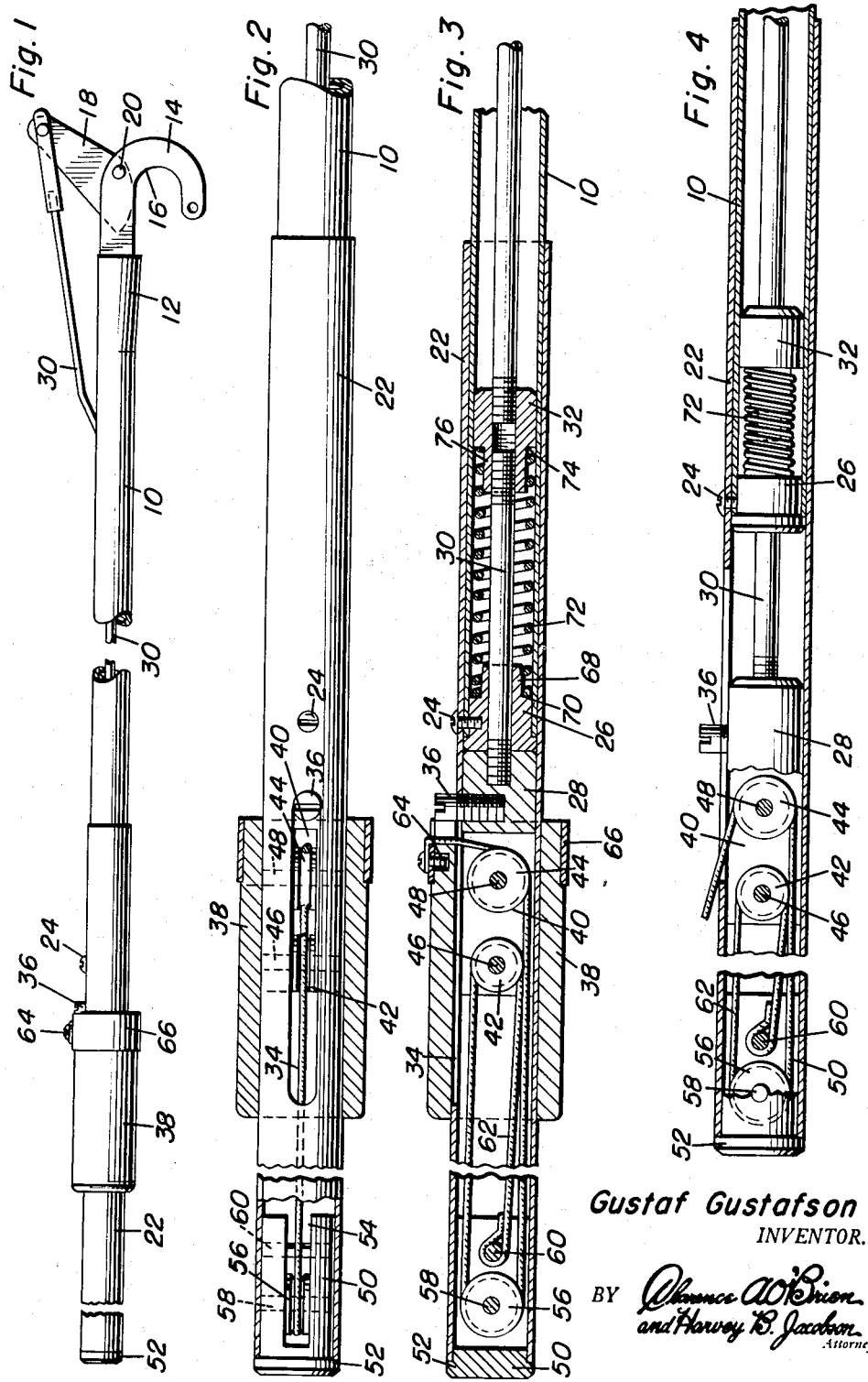

2,744,322

PRUNING IMPLEMENT

Gustaf Gustafson, Yakima, Wash.

Application September 29, 1953, Serial No. 383,007

1 Claim. (Cl. 30—249)

This invention relates to a pruning implement and is an improvement over that device described and claimed in my Patent No. 2,569,888, issued October 2, 1951.

The primary object of the present invention is to provide an improved pruning implement of the type defined in Patent No. 2,569,888 which is of more efficient and compact form and which is easier to carry and handle while employing means for continuously urging the movable blade thereof to a position where it is ready for subsequent cutting action.

The pruning implement constructed in accordance with the concepts of the present invention affords powerful leverage to the movable knife thereof so that the limbs of trees or the like may be severed with the minimum expenditure of effort on the part of the user.

The construction of this invention features a sleeve secured at the end of the pole to which the fixed blade is attached. Within the sleeve there is provided means for actuating a shaft connected to a movable blade pivoted relative to the fixed blade. These means specifically include a set of pulleys which are adapted to move the shaft relative to the pole to thus actuate the movable blade. Resilient means are provided for returning the movable blade back to its initial position ready for another cutting operation.

Still further objects of the invention reside in the provision of a pruning implement that is strong and durable, simple in construction and operation, capable of being readily manufactured for wide distribution at a relatively low cost, and which is exceedingly compact in construction.

These, together with the various ancillary objects and features of the invention which will become apparent as the following description proceeds, are attained by this pruning implement, a preferred embodiment of which has been illustrated in the accompanying drawings, by way of example only, wherein:

Figure 1 is an elevational view of the pruning implement comprising the present invention;

Figure 2 is an enlarged sectional detail view of the operator's end of the pruning implement showing the means used for actuating the movable blade;

Figure 3 is a sectional detail view taken on a plane normal to the plane of Figure 2 and illustrating the operating mechanism of the device in a position with the movable blade ready for a cutting operation; and, Figure 4 is a sectional detail view illustrating the relative positioning of the elements after the movable blade has been actuated.

With continuing reference to the accompanying drawings wherein like reference numerals designate similar parts throughout the various views, reference numeral 10 generally designates a pole having a flattened upper end 12 within which is snuggly fitted the shank of a hook-shaped fixed blade 14 provided with the usual concave cutting edge as at 16, the shank of the blade 14 being secured in the flattened end 12 by any suitable means. The customary movable blade 18 is pivotally attached at 20 to the blade 14 and coacts with the blade 14 for severing limbs of vegetation over which the blade 14 has previously been positioned.

Coaxial and concentric with the lower end of the pole 10 is a sleeve 22 which is locked to the pole 10 by means of a screw or other suitable fastener 24 passing through the sleeve 22 and the lower end of the pole 10 which is threadedly engaged in a lower collar member 26. Slidably positioned within the sleeve 22 is an operating block 28. Threadedly engaged with the block 28 is a shaft 30 relative to which the collar 26 is slidably mounted. The shaft 30 may be formed in a single section or in a plurality of sections as may be found necessary during the manufacture thereof and has an upper collar 32 threadedly engaged thereon and spaced from the lower collar 26. The cutting end of the pruning implement is provided, as is disclosed in Patent No. 2,569,888 with a suitable longitudinal elongated slot in the pole 10 through which the angulated end portion of the shaft 30 extend, the shaft being pivotally attached to the movable blade 18.

The sleeve 22 is provided with an elongated slot 34 therein through which a stop member 36 extends, the stop member 36 being threadedly attached to the operating block 28. The stop member 36 provides means for limiting the movement of an operating handle 38 coaxial with and slidably mounted on the sleeve 22. The operating block 28 is provided with a recess 40 therein within which pulley wheels 42 and 44 are journalled on shafts 46 and 48. The block 28 terminates at its lower end slightly below the pulley 42.

At the lower end of the sleeve 22 there is provided an anchor member 50 having a lower peripheral flange 52 adapted to engage the lowermost edge of the sleeve 22. The anchor member 50 is cylindrical in shape and adapted to be inserted within the sleeve 52 and is provided with a recess 54 therein within which a pulley wheel 56 is journalled on a shaft 58. A second shaft 60 provides an anchor means and extends across the recess 54. The upper end of the member 50 terminates slightly above shaft 60, the maximum distance between said upper end and the lower end of block 28 being slightly in excess of the length of slot 34. Secured to the anchoring shaft 60 is one end of a line 62 which is successively entrained about the pulley wheel 42, the pulley wheel 56, and then the pulley wheel 44. The other end of the line 62 is anchored by means of a fastener 64 to the operating handle 38. The operating handle 38 is provided with a retaining member 66 adapted to hold the end of the line 62 in a locked position.

It is noted that the collar 26 is provided with an upwardly extending portion 68 of reduced cross-section forming a shoulder 70 adapted to seat one end of a coil spring 72. The other end of the coil spring 72 is seated upon the shoulder 74 formed on the collar 32 by the downwardly projecting portion 76 of reduced cross-section. The spring 72 continuously biases the collar 26 against the operating block 28.

In operation, with the movable blade 18 in a position as is shown in Figures 1 and 3, the user need but pull the operating handle 38 downwardly relative to the sleeve 22. This will cause the operating block 28 to likewise be pulled downwardly relative to the sleeve 22. The pulley wheels 56, 42 and 44 provide mechanical means for reducing the amount of effort necessary to actuate the device against the resistance afforded by the limb of the tree to be cut and against the resistance afforded by the spring 72. Thus is achieved a high mechanical advantage. Upon movement of the operating block 28 downwardly with respect to the sleeve 22 the shaft 30 will be pulled downwardly compressing the spring 72 and moving the collar 32 closer to the collar 26, the collar 26 being fixed to the lower end of the pole 10 and to the sleeve 22. Hence, upon release of the operating handle 38 the energy stored in the spring 72 will return the blade 18 to its initial position ready for another cutting operation.

Since from the foregoing, the construction and advantages of this pruning implement are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

A pruning implement comprising a tubular pole, a hook-shaped fixed blade secured to the upper end of said pole, a movable blade pivoted to and coacting with said hook-shaped blade, a sleeve fixed to the lower end of said pole, a slot in said sleeve, a tubular operating handle slidably fitted on said sleeve, an operating block in said sleeve, a shaft secured to said block extending within and coaxial with said pole, said shaft being secured to said movable blade, and means interconnecting said block and said handle so that upon relative movement of said handle and said sleeve said shaft will move relative to said pole to actuate said movable blade, and a stop secured to said block extending through said slot in said sleeve, said block having a recess therein, said means comprising an anchor member secured to the end of said sleeve, a pulley wheel journalled in said anchor member, other pulley wheels journalled in said block and seated in said recess, and a line secured at one end to said anchor member and at the other end to said handle, said line being entrained about all of said pulley wheels, a lower collar secured at the lowest end of said pole to said pole and to said sleeve, an upper collar mounted on said shaft, and a spring biasing said upper collar and said lower collar to resiliently urge said lower collar against said block, and resiliently urging said handle to engage said stop.

References Cited in the file of this patent

UNITED STATES PATENTS

| | | |
|---|---|---|
| 1,125,057 | Bull | Jan. 19, 1915 |
| 1,246,685 | Unruh | Nov. 13, 1917 |
| 2,146,952 | Hamren | Feb. 14, 1939 |
| 2,246,730 | Hafdell | June 24, 1941 |
| 2,569,888 | Gustafson | Oct. 2, 1951 |